United States Patent [19]

Ligas et al.

[11] Patent Number: 5,391,327
[45] Date of Patent: Feb. 21, 1995

[54] PHOTOCHROMIC COMPOSITIONS OF IMPROVED FATIGUE RESISTANCE

[75] Inventors: John S. Ligas, Palm Harbor, Fla.; Michael S. Misura, Jr., Barberton, Ohio; Cletus N. Welch, Murrysville, Pa.

[73] Assignee: Transitions Optical, Inc., Pinellas Park, Fla.

[21] Appl. No.: 257,234

[22] Filed: Jun. 9, 1994

Related U.S. Application Data

[63] Continuation of Ser. No. 951,284, Sep. 25, 1992, abandoned.

[51] Int. Cl.$^6$ .................................................. G02B 5/23
[52] U.S. Cl. ...................................................... 252/586
[58] Field of Search ...................... 252/582, 586, 600; 524/100, 104, 110

[56] References Cited

U.S. PATENT DOCUMENTS

| | | | |
|---|---|---|---|
| 3,562,172 | 2/1971 | Ono et al. | 252/300 |
| 3,578,602 | 5/1971 | Ono et al. | 252/300 |
| 3,906,041 | 9/1975 | Hofer et al. | 260/588 S |
| 4,215,010 | 7/1980 | Hovey et al. | 252/300 |
| 4,342,668 | 8/1982 | Hovey et al. | 252/586 |
| 4,637,698 | 1/1987 | Kwak et al. | 351/163 |
| 4,720,356 | 1/1988 | Chu | 252/586 |
| 4,816,584 | 3/1989 | Kwak et al. | 544/71 |
| 4,818,096 | 4/1989 | Heller et al. | 351/163 |
| 4,826,977 | 5/1989 | Heller et al. | 544/70 |
| 5,066,818 | 11/1991 | Gemert et al. | 252/586 |

FOREIGN PATENT DOCUMENTS

92/09593  6/1992  WIPO .

OTHER PUBLICATIONS

"New Anti-UV-Stabilizers for Automotive Coatings"; Sandoz Chemicals, by L. Avar et al, 2-284/88.
"Sanduvor ® Ultraviolet Absorbers and Light Stabilizers for Coatings", Sandoz Chemicals, 2-242/90.
"Sanduvor ® VSU Powder", Product Bulletin, Sandoz Chemicals 2-117/90.

*Primary Examiner*—Philip Tucker
*Attorney, Agent, or Firm*—Irwin M. Stein

[57] ABSTRACT

Photochromic optical articles of improved resistance to light fatigue are provided by the use of a combination of hindered amine light stabilizer and asymmetric diaryloxalamide light stabilizer with a mixture of (1) photochromic material having a minima luminous transmission in the range of 560 to 630 nanometers and (2) photochromic material having a minima luminous transmission in the range of 430 to 520 nanometers.

22 Claims, No Drawings

PHOTOCHROMIC COMPOSITIONS OF IMPROVED FATIGUE RESISTANCE

This application is a continuation of application Ser. No. 07/951,284, filed Sep. 25, 1992, now abandoned.

DESCRIPTION OF THE INVENTION

The present invention relates to photochromic compositions of improved fatigue resistance and, more particularly, relates to organic photochromic compositions comprising (1) a combination of organic photochromic compounds that exhibit different activated colors and which are usually from two different organic photochromic families and (2) a combination of materials that improve the fatigue resistance of such photochromic compounds. Still more particularly, this invention relates to articles, e.g., ophthalmic lenses, containing such photochromic compositions.

When exposed to light radiation involving ultraviolet rays, such as the ultraviolet radiation in sunlight or the light of a mercury lamp, many organic photochromic compounds exhibit a reversible change in color. When the ultraviolet radiation is discontinued, the organic photochromic compound returns to its original color or colorless state. Various classes of photochromic compounds have been synthesized and suggested for use in applications in which a sunlight-induced reversible color change or darkening is desired. For example, spiro(indoline) pyrido benzoxazine photochromic compounds are described in U.S. Pat. No. 4,637,698. Spiro(indoline) naphthoxazines are described in U.S. Pat. Nos. 3,562,172, 3,578,602, 4,215,010 and 4,342,668. Benzopyrans and naphthopyrans having a nitrogen-containing substituent in the 2-position of the pyran ring are described in U.S. Pat. No. 4,818,096. All of the aforedescribed oxazine- and pyran-type organic photochromic compounds are reported to exhibit a color change of from colorless to purple/blue on exposure to ultraviolet (U.V.) light, e.g., sunlight.

Other organic photochromic compounds are reported to exhibit a color change of from colorless to yellow/orange when exposed to U.V. light. Examples of such organic photochromic compounds are benzopyrans and naphthopyrans having a spiro adamantane group in the 2-position of the pyran ring. These spiropyrans are described in U.S. Pat. No. 4,826,977. Other yellow/orange coloring organic photochromic compounds include the naphthopyran compounds described in U.S. Pat. No. 5,066,818. These compounds contain at least one ortho-substituted phenyl substituent at the 3-position of the pyran ring, preferably a monoortho-substituted phenyl substituent.

As reported in the literature, a major market demand for ophthalmic lenses are for those that darken to a brown or gray color. See, for example, U.S. Pat. No. 4,818,096 (column 2, lines 35–45). In order to obtain lenses which exhibit such a color change, blends of yellow/orange and purple/blue organic photochromic compounds have been suggested.

A drawback to the widespread commercial use of organic Photochromic compounds is the loss of their ability to change color as a result of prolonged repeated exposure to U.V. light, i.e., the organic photochromic compounds lose their photochromism or their ability to change color and revert to their original colorless state. The phenomenon is believed to be a result of irreversible decomposition of the organic photochromic compound and is referred to as fatigue or light fatigue.

It has been suggested that the light fatigue resistance of spiro(indoline)naphthoxazine compounds may be increased by the use of a hindered amine light stabilizer (HALS) and optionally a complex of the nickel ion with an organic ligand as a singlet oxygen quencher. See, for example, U.S. Pat. No. 4,720,356. While the use of a HALS material may improve the light fatigue resistance of a spiro(indoline) naphthoxazine compound, a similar stabilizing effect for organic naphthopyran compounds with a HALS material has not been observed. Consequently, there is a need for a stabilizing system which will improve the fatigue resistance of a combination of oxazine-type and pyran-type organic photochromic compounds.

It has now been discovered that the combination of certain asymmetric diaryloxalamide (oxanilide) compounds and hindered amine light stabilizer (HALS) compounds in certain proportions and in certain amounts improve the fatigue resistance of photochromic compositions comprising photochromic compound(s) that color to purple/blue, i.e., that have minima visible luminous transmission in the range of 560 to 630 nanometers, e.g., 580 to 620 nanometers, preferably about 600 nanometers, and photochromic compound(s) that color to yellow/orange, i.e., that have minima visible luminous transmission in the range of 430 to 520 nanometers, e.g., 450 to 500 nanometers, preferably about 480 nanometers.

DETAILED DESCRIPTION OF THE INVENTION

Asymmetric diaryloxalamide compounds that may be used in the photochromic compositions of the present invention are described in U.S. Pat. No. 3,906,041 and may be represented by graphic formula I.

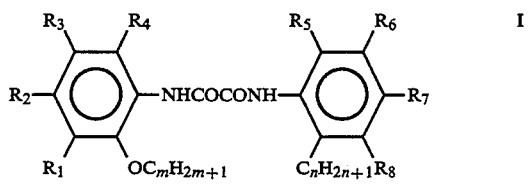

In graphic formula I, m is an integer of from 1 to 8, n is an integer of from 1 to 4, and $R_1$ through $R_8$ are each selected from the group consisting of hydrogen, chloro, bromo, $C_1$–$C_{12}$ alkyl, $C_1$–$C_4$ alkenyl, $C_1$–$C_4$ alkoxy, $C_6$–$C_8$ aryl, $C_6$–$C_8$ aryloxy and phenyl ($C_1$–$C_4$) alkyl. Preferably $R_1$, $R_2$, $R_4$, $R_5$, $R_7$ and $R_8$ in graphic formula I are methyl, ethyl, propyl, n-butyl, sec-butyl, t-butyl, preferably $C_1$–$C_2$ alkyl, m is an integer of from 1 to 4 and n is an integer of from to 2, e.g., 1 to 2.

The asymmetric diaryloxalamide compounds of graphic formula I may be prepared as described in U.S. Pat. No. 3,906,041, column 1, line 5 through column 2, line 22. That process involves the reaction of 1 mole of oxalic acid (or a functional derivative such as an ester, acid halide or ester halide) simultaneously or consecutively with 1 mole each of a compound of graphic formulae IA and IB

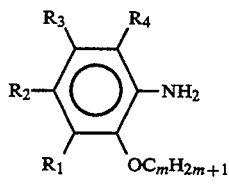

IA

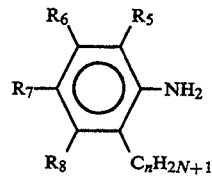

IB

Examples of asymmetric diaryloxalamide compounds include those found in Table I wherein $R_1$, $R_2$, $R_4$, $R_5$, $R_7$ and $R_8$ are hydrogen.

TABLE I

| Compound | m | n | $R_3$ | $R_6$ |
|---|---|---|---|---|
| 1 | 1 | 1 | H | $CH_3$ |
| 2 | 1 | 2 | H | H |
| 3 | 2 | 2 | H | H |
| 4 | 2 | 1 | H | $CH_3$ |
| 5 | 2 | 2 | $CH_3$ | H |
| 6 | 6 | 2 | H | H |
| 7 | 4 | 2 | H | H |
| 8 | 1 | 1 | $C_8H_{17}$ | $CH_3$ |
| 9 | 1 | 2 | $C_8H_{17}$ | H |
| 10 | 2 | 4 (iso) | H | H |
| 11 | 8 | 1 | H | $CH_3$ |
| 12 | 4 | 1 | H | $CH_3$ |
| 13 | 2 | 3 (iso) | H | H |
| 14 | 2 | 5 (iso) | H | H |
| 15 | 2 | 3 | H | H |
| 16 | 1 | 1 | $C_4H_9$ | $CH_3$ |
| 17 | 1 | 2 | $C_8H_{17}$ | H |
| 18 | 2 | 1 | $t$-$C_4H_9$ | H |
| 19 | 2 | 4 | $t$-$C_4H_9$ | H |
| 20 | 4 | 1 | H | $CH_3$ |
| 21 | 5 (iso) | 2 | H | H |
| 22 | 3 (iso) | 2 | H | H |
| 23 | 3 (n) | 2 | H | H |
| 24 | 8 | 2 | H | H |

Compound 1 in Table I may be named, o-methoxy-1'-methyl-oxalic acid bis-anilide; compound 2 may be named, o-methoxy-o'-ethyl-oxalic acid bis anilide; and compound 3 may be named o-ethoxy-o'-ethyl-oxalic acid bis anilide. Compounds 4–24 in Table I may be similarly named using the same system of nomenclature.

Other asymmetric diaryloxalamide compounds that may be used in the photochromic compositions of the present invention include those compounds of graphic formula I wherein $R_1$–$R_6$ and $R_8$ are hydrogen, n is 0 (zero) and $R_7$ is as defined in graphic formula I. Particularly contemplated is the compound wherein m is 2, and $R_7$ is isododecyl, which is available commercially under the trade name SANDUVOR 3206.

Hindered amine light stabilizers (HALS) have been described principally for use with polyolefins. More recently, U.S. Pat. No. 4,720,356 described their use with spiro(indoline) napthoxazines. HALS compounds that may be used in the photochromic compositions of the present invention include those described in U.S. Pat. No. 4,720,356, some of which HALS compounds may be represented by graphic formula II,

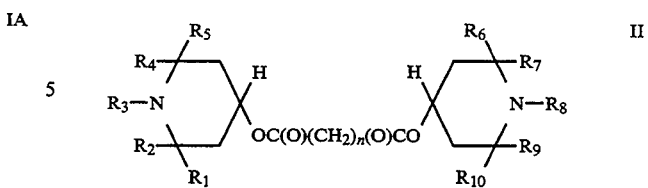

II wherein $R_1$, $R_2$, $R_4$–$R_7$, $R_9$ and $R_{10}$ are lower alkyl, e.g., $C_1$–$C_4$ alkyl, $R_3$ and $R_8$ are lower alkyl, e.g., $C_1$–$C_4$ alkyl or hydrogen, and n is an integer of from 1 to 12. Examples of such HALS materials are bis(2,2,6,6-tetramethyl-4-piperidyl) sebacate, i.e., $R_1$, $R_2$, $R_4$–$R_7$, $R_9$ and $R_{10}$ are methyl, $R_3$ and $R_8$ are hydrogen and n is 8, which is sold under the trade name TINUVIN 770; and bis(1,2,2,6,6-pentamethyl-4-piperidyl) sebacate, i.e., $R_1$, $R_2$, $R_4$–$R_7$, $R_9$ and $R_{10}$ are methyl, $R_3$ and $R_8$ are methyl and n is 8, which is sold under the trade name TINUVIN 765.

Other hindered amine light stabilizers that may be used in the photochromic compositions of the present invention may be represented by graphic formula IIA,

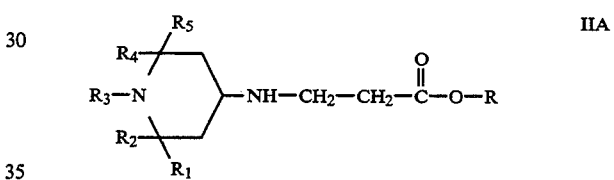

IIA wherein $R_1$, $R_2$, $R_4$ and $R_5$ are lower alkyl, e.g., $C_1$–$C_4$ alkyl, $R_3$ is hydrogen or lower alkyl and R is a $C_1$–$C_{18}$ alkyl, e.g., $C_{12}$–$C_{14}$ alkyl. An example of such a HALS material is available commercially under the trade name SANDUVOR 3052.

A further example of a hindered mine light stabilizer may be represented by graphic formula IIB.

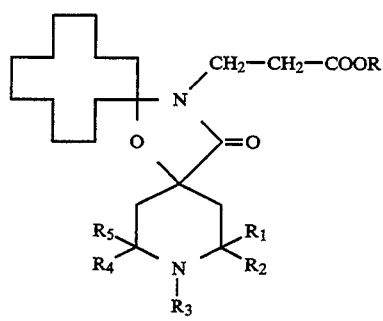

IIB wherein R and $R_1$–$R_5$ are the same as defined with respect to graphic formula IIA. An example of such a HALS material is available commercially under the trade name SANDUVOR 3050.

Still other HALS compounds that may be used in the photochromic compositions of the present invention may be represented by graphic formula III,

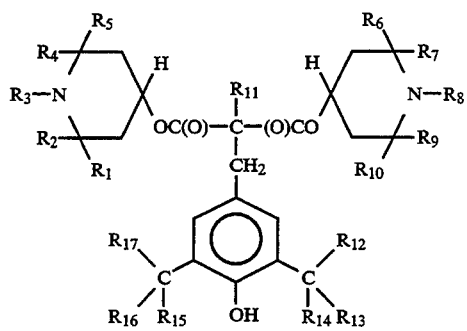

III

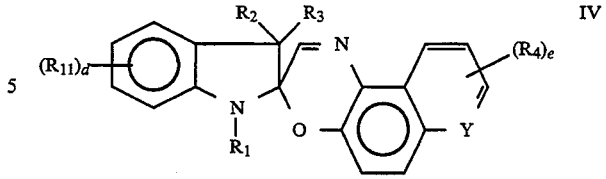

IV wherein $R_1$, $R_2$, $R_4$–$R_7$, and $R_9$–$R_{17}$ are lower alkyl, e.g., $C_1$–$C_4$ alkyl, and $R_3$ and $R_8$ are lower alkyl, e.g., $C_1$–$C_4$ alkyl, or hydrogen. An example of such a HALS material is bis(1,2,2,6,6-pentamethyl-4-piperidinyl) [3,5-bis(1,1-dimethylethyl-4-hydroxyphenyl) methyl]butyl-propanedioate, i.e., $R_1$, $R_2$, $R_4$–$R_7$, $R_9$, $R_{10}$, $R_{12}$–$R_{17}$ are methyl, $R_{11}$ is butyl, and $R_3$ and $R_8$ are methyl, which is sold under the trade name TINUVIN 144.

Other HALS materials contemplated are those sold under the trade name CHIMASSORB 944, the graphic formula for which is described in column 5, lines 1–25 of U.S. Pat. No. 4,720,356, CYASORB 3346, the graphic formula for which is described in column 5, lines 26–49 of the '356 patent, and TINUVIN 622, the graphic formula for which is described in column 5, lines 50–68 of the '356 patent. Such graphic formulas may be incorporated herein if required. Preferably, the amine of the hindered amine light stabilizer is a tertiary amine.

The HALS and diaryloxalamide stabilizer materials used in the present composition are incorporated in the photochromic composition so as to be in close physical proximity to the organic photochromic compounds used in the composition. This may be accomplished by mixing the stabilizer materials with the organic photochromic compounds prior to their incorporation into or applying them to an organic host material, or by sequentially introducing the photochromic compound(s) and stabilizer materials (in any order) into or applying them to the organic host material.

The total amount of stabilizer materials used in the photochromic composition will be in stabilizing amounts, and will typically range from about 0.3 parts to about 1.5 parts per part of the total amount of organic photochromic compounds in the composition. (As used herein, the value part/part is intended to mean parts by weight.) More particularly, from about 0.3 to about 1.0 parts of total stabilizer materials per part of the total amount of organic photochromic compounds in the photochromic composition are used. The weight ratio of diaryloxalamide to HALS stabilizer will typically vary from about 1:1 to about 3:1, e.g., 2:1.

Spiro(indoline) pyrido benzoxazines and spiro(indoline) naphthoxazine photochromic compounds that color to purple/blue may be represented by the following graphic formula IV.

In the above graphic formula IV, $R_1$ may be selected from the group consisting of $C_1$–$C_8$ alkyl, e.g., methyl, ethyl, n-propyl, isopropyl, butyl, etc., phenyl, phen(-$C_1$–$C_4$)alkyl, e.g., benzyl, naphth($C_1$–$C_4$)alkyl, e.g., 1-naphthylmethyl, allyl, acrylyl($C_2$–$C_6$)alkyl, methacrylyl-($C_2$–$C_6$)alkyl, carboxy($C_2$–$C_6$)alkyl, e.g., β-carboxyethyl, γ-carboxypropyl, δ-carboxybutyl, cyano(C-2–$C_6$)alkyl, e.g., β-cyanoethyl, γ-cyanopropyl, β-cyanoisopropyl, and δ-cyanobutyl, $C_1$–$C_4$ acyloxy(C-2–$C_6$)alkyl, i.e., [$R_cC(O)OR_d$–, wherein $R_c$ is a $C_1$–$C_4$ alkyl and $R_d$ is a $C_2$–$C_6$ alkyl], e.g., acetoxyethyl, acetoxypropyl, propionyloxyethyl, acetoxybutyl, and proptonyloxypropyl, hydroxy($C_2$–$C_6$)alkyl, e.g., hydroxyethyl, hydroxypropyl and hydroxybutyl, $(C_2H_4O)_m\cdot CH_3$, wherein m is a number of from 1 to 6, and mono- and disubstituted phenyl, said phenyl substituents being selected from $C_1$–$C_4$ alkyl and $C_1$–$C_5$ alkoxy, e.g., methoxy, ethoxy, propoxy, butoxy and pentoxy. Preferably, $R_1$ is selected from the group consisting of $C_1$–$C_4$ alkyl, phenyl, benzyl, 1-naphth($C_1$–$C_2$)alkyl, such as 1-naphthylmethyl, carboxy($C_2$–$C_4$)alkyl, cyano($C_2$–$C_4$)alkyl, $C_1$–$C_4$ acyloxy($C_2$–$C_4$)alkyl, e.g., $C_1$–$C_4$ acyloxyethyl, hydroxy($C_2$–$C_4$)alkyl, and $(C_2H_4O)_m\cdot CH_3$, wherein m is a number of from 1 to 3, e.g., 2.

$R_2$ and $R_3$ of the above graphic formula IV may each be selected from the group consisting of $C_1$–$C_5$ alkyl, phenyl, mono- and disubstituted phenyl, benzyl, or $R_2$ and $R_3$ may combine to form a cyclic ring selected from the group consisting of an alicyclic ring containing from 6 to 8 carbon atoms (including the spiro carbon atom), norbornyl and adamantyl. The aforesaid phenyl substituents may be selected from $C_1$–$C_4$ alkyl and $C_1$–$C_5$ alkoxy radicals. More particularly, $R_2$ and $R_3$ are each selected from $C_1$–$C_5$ alkyl, e.g., methyl, ethyl, propyl, butyl and pentyl, and phenyl. When one of $R_2$ or $R_3$ is a tertiary alkyl radical, such as tertiary butyl or tertiary amyl, the other is preferably an alkyl radical other than a tertiary alkyl radical.

Y in graphic formula IV may be carbon or nitrogen. The number and type of non-hydrogen substituent groups represented by $R_4$ will vary depending upon whether Y is carbon or nitrogen. Generally, when Y is carbon each $R_4$ substituent may be selected from the group consisting of halogen, e.g., chloro, fluoro, or bromo, $C_1$–$C_5$ alkyl, $C_1$–$C_5$ alkoxy, e.g., methoxy, ethoxy, propoxy, butoxy and pentoxy, nitro, cyano, thiocyano, $C_1$–$C_4$ monohaloalkyl, e.g., $C_1$–$C_4$ monochloroalkyl, such as chloromethyl and chloroethyl, $C_1$–$C_2$ polyhaloalkyl, as, for example, trihaloalkyl such as trtchloroalkyl or trifluoroalkyl, e.g., trifluoromethyl and 2,2,2-trifluoroethyl, and monoalkylamino or dialkylamino wherein the alkyl moiety of the alkylamino group contains from one to four carbon atoms, e.g., methylamtno, ethylamino, propylamino, dtmethylamtno and diethylamino.

The letter "e" in graphic formula IV is an integer of from 0 to 2, e.g., 1, and denotes the number of non-hydrogen $R_4$ substituents. In particular, when "e" is 1 or 2 and Y is carbon, each $R_4$ substituent may be selected from the group $C_1-C_2$ alkyl, $C_1-C_2$ alkoxy, chloro, fluoro, bromo, nitro, and trifluoromethyl. When "e" is 0 (zero), there are no $R_4$ substituents and all of the aromatic carbon atoms in the naphtho group have their full complement of hydrogen atoms for the aromatic group shown.

When Y is nitrogen, each $R_4$ (non-hydrogen) substituent may be selected from $C_1-C_5$ alkyl, e.g., $C_1-C_2$ alkyl, $C_1-C_5$ alkoxy, e.g., $C_1-C_2$ alkoxy, and halogen, e.g., chloro, fluoro or bromo. Typically, "e" is 0 (zero) when Y is nitrogen and thus there are no $R_4$ substituents.

Each $R_{11}$ in graphic formula IV may be selected from $C_1-C_5$ alkyl, halogen, $C_1-C_5$ alkoxy, nitro, cyano, $C_1-C_4$ monohaloalkyl, $C_1-C_4$ polyhaloalkyl, $C_1-C_8$ alkoxycarbonyl, and $C_1-C_4$ acyloxy, i.e., $R_cC(O)O$—, wherein $R_c$ is a $C_1-C_4$ alkyl, e.g., methyl. The letter "d" in graphic formula IV represents an integer that may vary from 0 to 4, e.g., 0 to 2, such as 1 or 2, and denotes the number of non-hydrogen substituents. When "d" is 0 (zero), there are no $R_{11}$ substituents and all of the aromatic carbon atoms have their full complement of hydrogen atoms for the indole group.

More particularly, spiro(indolino) pyridobenzoxazines (when Y is nitrogen) may be represented by the following graphic formula V:

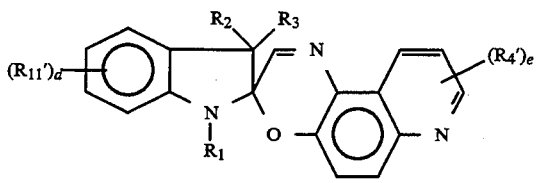

In graphic formula V, $R_1$, $R_2$ and $R_3$ are the same as defined with respect to graphic formula IV. Each $R_4'$ may be selected from $C_1-C_5$ alkyl, e.g., $C_1-C_2$ alkyl, $C_1-C_5$ alkoxy, e.g., $C_1-C_2$ alkoxy and halogen, e.g., chloro, fluoro or bromo. The letter "e" may be 0 or 1. Commonly, "e" is 0, and thus, there are no $R_4'$ substituents. When "e" is 1, the $R_4$ substituent may be located on any of the available carbon atoms of the pyrido moiety of the pyrido benzoxazine portion of the compound, i.e., at the 5', 6', 8' 9' or 10' positions, most usually at the 8', 9' or 10' positions.

Each $R_{11}'$ in graphic formula V may be selected from the group consisting of $C_1-C_5$ alkyl, e.g., methyl, ethyl, propyl, butyl and pentyl, halogen, e.g., chloro and fluoro, $C_1-C_5$ alkoxy, e.g., methoxy, ethoxy, propoxy, butoxy and pentoxy, nitro, cyano, $C_1-C_4$ monohaloalkyl, e.g., chloromethyl, fluoromethyl, chloroethyl, chloropropyl, etc., $C_1-C_4$ polyhaloalkyl, e.g., trihaloalkyl, $C_1-C_8$ alkoxycarbonyl, and $C_1-C_4$ acyloxy, i.e., $R_cC(O)O$—, wherein $R_c$ is a $C_1-C_4$ alkyl, e.g., methyl. An example of an acyloxy group is acetoxy. While any halogen, i.e., chlorine, bromine, iodine and fluorine may be used in respect to the aforesaid halogen or haloalkyl substituents, chlorine, fluorine and bromine, particularly, chlorine and fluorine, are preferred for the halogen substituent and fluorine is preferred for the polyhaloalkyl substituent, e.g., trifluoromethyl, ($CF_3$). Preferably, $R_{11}'$ is selected from the group consisting of $C_1-C_2$ alkyl, chlorine, fluorine, $C_1-C_2$ trihaloalkyl, e.g., trihalomethyl such as trifluoromethyl and $C_1-C_5$ alkoxy.

The letter "d" in graphic formula V is an integer from 0 to 4, e.g., 0 to 2, such as 1 or 2. When "d" is 2 or more, each $R_{11}'$ substituent may be the same or different and in either case, are selected from the aforedescribed group. The $R_{11}'$ substituent(s) may be located on any of the available carbon atoms of the benzene ring of the indolino portion of the compound, i.e., at the 4, 5, 6 or 7 positions.

It is possible that photochromic organic substances of graphic formula V (and VI) may be a mixture of isomers due to the alternative directional mechanism by which intramolecular condensation occurs during formation of the starting indole reactant (Fischer's base). Indolization of 3-substituted phenylhydrazones can give rise to a 4-substituted indole, a 6-substituted indole, or mixtures thereof. Thus, when "d" is 1, the photochromic substance may be substituted at the 4 position on the indoline ring, at the 6 position of that ring or comprise a mixture of such isomers. When "d" is 2, the $R_{11}'$ substituents may be present at any combination of the 4, 5, 6, or 7 carbon atoms of the indoline ring and may comprise an isomeric mixture of such compounds, e.g., a mixture of compounds having substituents at the 4 and 5, 4 and 6, 5 and 6, 4 and 7, 5 and 7, and 6 and 7 positions of the indoline ring. Commonly, when "d" is 2 the $R_{11}'$ substituents are located at the 4 and 5, or 5 and 6 positions. Also contemplated are materials containing mixtures of such isomers, e.g., materials comprising 4 (and 6) and 5-substituted spiro(indolino) pyrido benzoxazines.

Non-limiting examples of spiro(indolino) pyridobenzoxazines of graphic formula V are described in Table 1. Such pyridobenzoxazines are those in which $R_1$, $R_2$, $R_3$, and $R_{11}'$ are as indicated in Table 1, the letter "e" is 0 (zero), and the letter "d" is 0, 1 or 2. A hyphen (-) indicates the absence of a non-hydrogen substituent.

TABLE 1

| Compound/ | $R_1$ | $R_2$ | $R_3$ | $R_{11}'$ | $R_{11}'$ |
|---|---|---|---|---|---|
| 1 | $CH_3$ | $CH_3$ | $CH_3$ | — | — |
| 2 | $CH_3$ | $CH_3$ | $CH_3$ | 4(6)-$CH_3$ | 5-$CH_3$ |
| 3 | $CH_3$ | $CH_3$ | $CH_3$ | 5-$OCH_3$ | — |
| 4 | $CH_3$ | $CH_3$ | $CH_3$ | 5-Cl | 6-$CH_3$ |
| 5 | $CH_3$ | $CH_3$ | $C_2H_5$ | — | — |
| 6 | $CH_3$ | $CH_3$ | $C_2H_5$ | 5-$CH_3$ | 4(6)-$CH_3$ |
| 7 | $CH_3$ | $C_2H_5$ | $C_2H_5$ | — | — |
| 8 | n-$C_4H_9$ | $CH_3$ | $C_2H_5$ | — | — |
| 9 | $CH_3$ | $CH_3$ | phenyl | — | — |
| 10 | $CH_3$ | phenyl | phenyl | — | — |
| 11 | $C_2H_5$ | $CH_3$ | $C_2H_5$ | 4(6)-$CH_3$ | 5-$CH_3$ |
| 12 | n-$C_4H_9$ | $CH_3$ | $C_2H_5$ | 5-$CH_3$ | (4)6-$CH_3$ |
| 13 | $CH_3$ | $CH_3$ | $CH_3$ | 5-$CH_3$ | (4)6-$CH_3$ |
| 14 | n-$C_3H_7$ | $CH_3$ | $CH_3$ | 5-$CH_3$ | — |
| 15 | n-$C_3H_7$ | $CH_3$ | $CH_3$ | 5-$OCH_3$ | — |
| 16 | n-$C_3H_7$ | $CH_3$ | $CH_3$ | 4(6)-$CH_3$ | 5-$CH_3$ |

Compound 2 in Table 1 may be named 1,3,3,4(and 6),5-pentamethylspiro-[indolino-2,3' [3H]pyrido [3,2-f] [1,4] benzoxazine]. Similarly, compound 6 in Table 1 may be named 1,3,4(and 6), 5-tetramethyl-3-ethylspiro-[indolino-2,3' [3H] pyrido [3,2-f][1,4] benzoxazine]. Other compounds in Table 1 may be similarly named taking into account the different substituents. Moreover, compounds derived from the description of graphic formula V may be similarly named by substituting the substituents described with respect to $R_1$, $R_2$, $R_3$, $R_4'$ and $R_{11}'$ for those found in the description and in Table 1. When the letter "e" is 1 or more, the $R_4'$ substituent(s) are given a prime (') designation. For nomenclature purposes, numbering of the pyrido benzoxazine portion of the molecule is counter clockwise starting with the nitrogen atom of the oxazine ring as the number 1' position. Numbering of the indolino portion of the molecule is counter clockwise starting with the nitrogen atom as the number 1 position.

Spiro(indolino)naphthoxazines that may be used in the practice of the present process may be represented by the following graphic formula:

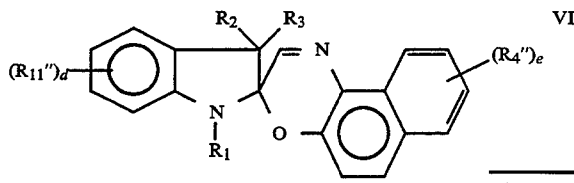

wherein $R_1$, $R_2$ and $R_3$ are the same as that described with respect to graphic formula IV.

Each $R_4''$ substituent in graphic formula VI may be selected from the group consisting of halogen, e.g., chloro, fluoro, or bromo, $C_1-C_5$ alkyl, $C_1-C_5$ alkoxy (e.g., methoxy, ethoxy, propoxy, butoxy and pentoxy), nitro, cyano, thiocyano, $C_1-C_4$ monohaloalkyl, e.g., $C_1-C_4$ monochloroalkyl, such as chloromethyl and chloroethyl, $C_1-C_2$ polyhaloalkyl, as for example, trihaloalkyl, such as trichloroalkyl or trifluoroalkyl, e.g., trifluoromethyl and 2,2,2-trifluoroethyl, and monoalkylamino or dialkylamino, wherein the alkyl moiety of the alkylamino group contains from 1 to 4 carbon atoms, e.g., methylamino, ethylamino, propylamino, dimethylamino and diethylamino. More particularly, the $R_4''$ substituent may be selected from the group $C_1-C_2$ alkyl, $C_1-C_2$ alkoxy, chloro, fluoro, bromo, nitro and trifluoromethyl. The letter "e" in graphic formula VI is an integer from 0 to 2, e.g., 1 or 2, and denotes the number of non-hydrogen $R_4''$ substituents. When "e" is 0, there are no $R_4''$ substituents and all of the aromatic carbon atoms of the naphtho moiety of the molecule represented by formula VI have their full complement of hydrogen atoms for the naphtho group shown.

As in the case with graphic formula V, when "e" is 1, the $R_4''$ substituent may be located on any of the available carbon atoms of the naphtho moiety of the naphehoxazine portion of the molecule, i.e., at the 5', 6', 7' 8', 9' or 10' positions. Preferably, the $R_4''$ substituent is present on the 7', 8' or 9' carbon atoms. When "e" is 2, the $R_4''$ substituents may be same or different and in either case are selected from the above-described group. When "e" is 2, the $R_4''$ substituents are commonly located at the 7' and 9', or 8' and 10' positions. For nomenclature purposes, numbering of spiro(indolino) naphthoxazines is the same as that described with regard to the spiro(indolino) pyrido benzoxazines of graphic formula V. $R_{11}''$ and the letter "d" in graphic formula VI are the same as that described with respect to $R_{11}$ and d in graphic formula IV.

Non-limiting examples of spiro(indolino) naphthoxazines selected from the description of graphic formula VI are described in Table 2. Such spiro(indolino) naphthoxazines are those in which $R_1$, $R_2$, $R_3$, $R_4''$ and $R_{11}''$ are as indicated in Table 2, the letter "d" is 0, 1 or 2 and the letter "e" is 1. As in Table 1, a hyphen (-) indicates the absence of a non-hydrogen substituent. In Table 2, all of the $R_4''$ substituents are at the 9' carbon position.

TABLE 2

| Compound/ | $R_1$ | $R_2$ | $R_3$ | $R_4''$ (9'—) | $R_{11}''$ | $R_{11}''$ |
|---|---|---|---|---|---|---|
| 1 | $CH_3$ | $CH_3$ | $CH_3$ | $OCH_3$ | — | — |
| 2 | $CH_3$ | $CH_3$ | $CH_3$ | $OCH_3$ | 5-$CH_3$ | (4)6-$CH_3$ |
| 3 | $CH_3$ | $CH_3$ | $CH_3$ | $OCH_3$ | 5-$OCH_3$ | — |
| 4 | $CH_3$ | $CH_3$ | $CH_3$ | $OCH_3$ | 5-Cl | (4)6-$CH_3$ |
| 5 | $CH_3$ | $CH_3$ | $C_2H_5$ | $OCH_3$ | — | — |
| 6 | $CH_3$ | $CH_3$ | $C_2H_5$ | $OCH_3$ | 5-$CH_3$ | (4)6-$CH_3$ |
| 7 | $CH_3$ | $C_2H_5$ | $C_2H_5$ | $OCH_3$ | — | — |
| 8 | n-$C_4H_9$ | $CH_3$ | $C_2H_5$ | $OCH_3$ | — | — |
| 9 | $CH_3$ | $CH_3$ | phenyl | $OCH_3$ | — | — |
| 10 | $CH_3$ | phenyl | phenyl | $OCH_3$ | — | — |
| 11 | $CH_3$ | p-$C_6H_4OCH_3$ | p-$C_6H_4OCH_3$ | $OCH_3$ | — | |
| 12 | $C_2H_5$ | $CH_3$ | $C_2H_5$ | $OCH_3$ | 5-$CH_3$ | — |
| 13 | n-$C_4H_9$ | $CH_3$ | $C_2H_5$ | $OCH_3$ | 5-$CH_3$ | — |

Compound 2 in Table 2 may be named 1,3,3,4(and 6),5-pentamethyl-9'-methoxy-spiro[indolino-2,3' [3H]-naphth [2,1-b] [1,4]-oxazine]. Similarly, compound 6 in Table 2 may be named 1,3,4 (and 6),5-tetramethyl-3-ethyl-9'-methoxyspiro [indolino-2,3' [3H]-naphth [2,1-b] [1,4]-oxazine. Other compounds in Table 2 can be similarly named taking into account the different substituents. Moreover, compounds derived from the description of graphic formula IV may be similarly named.

Spiro(indolino) benzoxazines compounds that color to purple/blue are described in U.S. Pat. No. 4,816,584 may be represented by the following graphic formula VII.

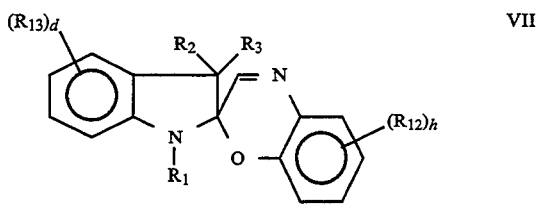

wherein $R_1$, $R_2$, $R_3$ and d are the same as described with respect to graphic formula IV and $R_{12}$ and $R_{13}$ are each selected from the group consisting of $C_1-C_5$ alkyl, e.g., $C_1-C_2$ alkyl, $C_1-C_5$ alkoxy, e.g., $C_1-C_2$ alkoxy, preferably methoxy, and h is the integer 1 or 2.

When "h" is 1, the $R_{12}$ substituent may be located on any of the available carbon atoms of the benzene ring of the benzoxazine moiety, i.e., at the 5, 6, 7 or 8 positions. Preferably, the $R_{12}$ substituent is located at the number 5, 6, or 7 carbon atom. When "h" is 2, the $R_{12}$ substituents may be the same or different and in either case are selected from the above-described group. When "h" is 2, the $R_{12}$ substituents are desirably located at the 5 and 7 or 6 and 8 positions.

Examples of spiro(indolino)benzoxazines within the scope of graphic formula VII are listed in Table 3. Compound 1 may be named: 7-methoxy-1',3',3',4' (and 6'), 5'-pentamethylspiro-[2H-1,4-benzoxazine-2,2'-indoline].

Compounds 2–6 may be similarly named as substituted spiro(indolino) benzoxazines using the substituents described in Table 3 for such compounds. Moreover, compounds derived from the description of graphic formula VII may be similarly named. In naming the spiro(indoline)benzoxazines, the IUPAC rules of organic nomenclature have been used. The positions of the indolino portion of the molecule have been numbered counterclockwise starting with the nitrogen atom as the number one (1) position, and are identified by a prime number, e.g., 3'. The positions of the benzoxazine portion of the molecule have been numbered clockwise starting with the oxygen atom as the number one (1) position.

TABLE 3

| Compound No. | $R_1$ | $R_2$ | $R_3$ | $R_{13}$ | $R_{13}$ | $R_{12}$ | $R_{12}$ |
|---|---|---|---|---|---|---|---|
| 1 | Me | Me | Me | 4(6)-Me | 5-Me | 7-OMe | — |
| 2 | Me | Me | Me | 4(6)-Me | 5-Me | 7-OMe | 5-OMe |
| 3 | Me | Me | Me | 5-OMe | — | 7-OMe | 5-OMe |
| 4 | Me | Me | Me | 4(6)-Me | 5-Me | 7-OMe | 6-Ome |
| 5 | Me | Me | Et | — | — | 7-OMe | 5-OMe |
| 6 | nBu | Me | Me | — | — | 7-OMe | 5-OMe |

Key:
Me = methyl
nBu = n-butyl
Et = ethyl
OMe = methoxy

Naphthopyran compounds having a nitrogen-containing substituent in the 2-position of the pyran ring are described in U.S. Pat. No. 4,818,096 and may be represented by the following graphic formula VIII,

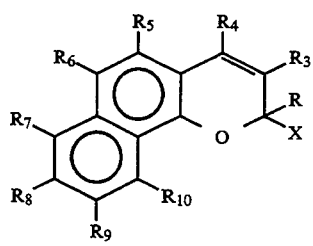

wherein $R_3$–$R_{10}$ are each selected from hydrogen, lower alkyl, e.g., $C_1$–$C_5$ alkyl, $C_1$–$C_5$ alkoxy, hydroxy, $C_1$–$C_5$ alkylamino, or $C_1$–$C_5$ dialkylamino, $C_1$–$C_5$ alkylaminophenyl or halogen, e.g., chloro, provided that $R_3$ and $R_4$ are not alkoxy, hydroxy, alkylamino or dialkylamino, R is lower alkyl, phenyl or phenyl containing a nitrogen-containing substituent in the ortho- or para-position, and X is an aryl group, e.g., phenyl, having a nitrogen-containing substituent, in the ortho- or para-position, e.g., a primary, secondary or tertiary amino, morpholino, piperidino, pyridino, pyrazolino or pyrrolidino group.

The aforedescribed photochromic oxazine-type compounds and naphthopyran compounds having a nitrogen-containing substituent in the 2-position of the pyran ring color to purple/blue when activated by UV light. Such compounds exhibit a minima luminous transmission in the range of 560 to 630 nanometers, and may be used with the following described photochromic pyran-type compounds which color to yellow/orange when activated with UV light. These later pyran-type compounds exhibit a minima luminous transmission in the range of 430 to 520 nanometers.

Photochromic naphthopyrans having at least one ortho-substituted phenyl group at the 3-position of the pyran ring are described in U.S. Pat. No. 5,066,818. Such compounds color to yellow/orange upon activation with UV light and may be represented by the following graphic formula IX,

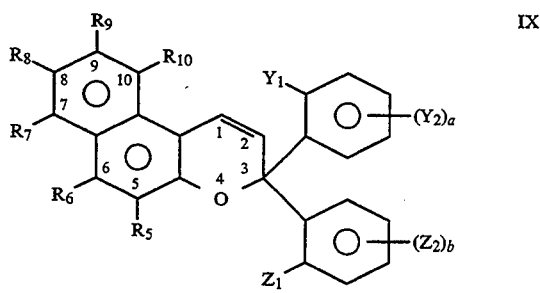

In graphic formula IX, $Y_1$ may be selected form the group consisting of $C_1$–$C_5$ alkyl, $C_1$–$C_5$ alkoxy, fluoro and chloro. Preferably $Y_1$ is selected from the group consisting of $C_1$–$C_3$ alkyl, $C_1$–$C_3$ alkoxy and fluoro. In graphic formula IX, $Z_1$ may be selected from the group consisting of hydrogen and $Y_1$. Each $Y_2$ and $Z_2$ may be selected from the group consisting of $C_1$–$C_5$ alkyl, $C_1$–$C_5$ alkoxy, cyano, hydroxy, halogen, preferably chloro or fluoro, acrylyl, methacrylyl, acryloxy($C_1$–$C_4$) alkyl, and methacryloxy ($C_1$–$C_4$) alkyl. Preferably, each $Y_2$ and $Z_2$ are selected from the group consisting of $C_1$–$C_3$ alkyl, $C_1$–$C_3$ alkoxy and fluoro. The letters a and b in graphic formula IX are each an integer selected from the group consisting of 0, 1 or 2. When a or b are 0 (zero), the phenyl groups have their appropriate complement of ring hydrogens.

A variety of substituents may be placed on the naphtho portion of the naphthopyran compounds of graphic formula IX. For example, the naphtho moiety may be substituted in the positions represented by $R_5$–$R_{10}$ in graphic formula IX with $C_1$–$C_{10}$ straight and branched chain alkyl, $C_5$–$C_7$ cycloalkyl, phenyl, mono- or di-substituted phenyl, $C_1$–$C_4$ alkoxy, halogen, i.e., chlorine, fluorine, bromine and iodine, acrylyl, methacrylyl acryloxy ($C_1$–$C_4$) alkyl, methacryloxy ($C_1$–$C_4$) alkyl, and five or six-membered heterocyclic groups connected to the naphthopyran rings by a single bond, e.g., furyl and thienyl. More particularly, when other than hydrogen, each $R_5$–$R_{10}$ may be $C_1$–$C_5$ straight or branched chain alkyl, e.g., methyl, ethyl, n-propyl, isopropyl, butyl, and pentyl $C_5$–$C_6$ cycloalkyl, e.g., cyclopentyl and cyclohexyl, $C_1$–$C_3$ alkoxy, e.g., methoxy, ethoxy and propoxy, chlorine (chloro), bromine (bromo), 2- or 3- furyl, 2- or 3- thienyl, phenyl, and ortho-, meta- or para-substituted phenyl. The aforedescribed phenyl substituent(s) each may be selected from the group consisting of $C_1$–$C_4$ alkyl, $C_1$–$C_4$ alkoxy, chloro and bromo. Preferably, the phenyl group is substituted with one substituent and that substituent is in the para position, e.g., p-methyl, phenyl, p-chloro phenyl and p-methoxy phenyl. Still more particularly, $R_5$–$R_{10}$ substituents may be $C_1$–$C_3$ alkyl, $C_1$–$C_3$ alkoxy, chloro, bromo, phenyl and $C_2$–$C_3$ alkoxyphenyl, e.g., p-methoxy phenyl.

In naming and referring to the naphthopyran compounds of graphic formula IX, positions on the naphthopyran rings are numbered as shown. The naphtho moiety may be substituted at the 5,6,7,8,9 and/or 10 position, i.e., $R_5$–$R_{10}$. When not so substituted, $R_5$–$R_{10}$ are hydrogen. In certain contemplated embodiments, the naphtho moiety ring is substituted at the 10-position, at the 10 and 9-positions, or the 10- and 6-positions, i.e., $R_{10}$, $R_{10}$ and $R_9$, or $R_{10}$ and $R_6$ respectively. In such embodiments, $R_5$-$R_9$, $R_5$-$R_8$, or $R_7$-$R_9$ and $R_5$ are respectively each hydrogen. In naming the phenyl groups attached to the pyran ring, the carbon atoms are numbered clockwise starting with the carbon atom attached to the 3-position of the pyran ring.

In a particular embodiment, the naphtho moiety is unsubstituted, i.e., $R_5$-$R_{10}$ are each hydrogen, $Y_1$ is selected from the group consisting of $C_1$-$C_3$ alkyl, $C_1$-$C_3$ alkoxy and fluoro, $Z_1$ is hydrogen, $Y_2$ is $C_1$-$C_3$ alkoxy or hydrogen, $Z_2$ is selected form the group consisting of $C_1$-$C_3$ alkoxy, $C_1$-$C_3$ alkyl and hydrogen, a is 0 or and b is 0, 1 or 2. $Y_2$ and $Z_2$ substituents may be located at any of the unsubstituted positions of their respective phenyl groups; namely positions 3, 4, 5 and 6, preferably at the 3, 4 or 5 positions. When a or b is 1, the substituent is preferably located meta or pars to the carbon atom attached to the pyran ring. When a and b are 2, the substituents may be located at any two of the Unsubstituted carbon atoms of the respective phenyl group; namely positions 3 and 4, 3 and 5, 3 and 6, 4 and 5 or 4 and 6, preferably at the 3 and 4, 3 and 5 or 4 and 5 carbon atoms.

Examples of the aforedescribed naphthopyrans include:

(1) 3(2-fluorophenyl)-3(4-methoxyphenyl)-3H-naphtho[2,1-b]pyran.
(2) 3(2-fluorophenyl)-3(4'-methoxyphenyl)-8-methoxy-3H-naphtho[2,1-b]-pyran.
(3) 3(2,4-dimethoxyphenyl)-3(4-methoxyphenyl)-3H-naphtho[2,1-b]-pyran.
(4) 3(2-fluorophenyl)-3(3,4-dimethoxyphenyl)-3H-naphtho[2,1-b]pyran.
(5) 3(2-methyl-4-methoxyphenyl)-3(4-methoxyphenyl)-3H-naphtho[2,1-b]pyran.
(6) 3(2-methylphenyl)-3(4-methoxyphenyl)-3H-naphtho[2,1-b]pyran.
(7) 3-phenyl-3(2,4-dimethoxyphenyl)-3H-naphtho[2,1-b]pyran.
(8) 3(2,6-difluorophenyl)-3(4-methoxyphenyl)-3H-naphtho[2,1-b]-pyran.

A further example of organic photochromic compounds that exhibit a color change from colorless to yellow/orange are the naphthopyran compounds described in International Patent Publication WO 92/09593, a complete description of which may be reproduced herein if required. In particular, certain of such organic photochromic compounds may be represented by the following graphic formula IXA.

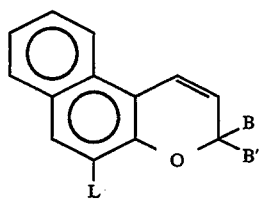

L in graphic formula IXA is the group —W—T(Z)=Xg, wherein preferably W is oxygen, carbon or nitrogen such as —O—,

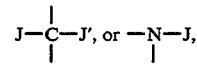

preferably oxygen, (J and J' are each selected from hydrogen, $C_1$-$C_4$ alkyl, or J and J' taken together is a single oxygen, e.g., —C(O)—); T is carbon and bears a partial positive charge; Z is a $C_1$-$C_4$ alkyl, e.g., methyl, phenyl, or $C_1$-$C_4$ monoalkylamino, e.g., methylamino ($CH_3NH$—); X is oxygen and g is the integer one (1). Examples of L are acetoxy, benzoyloxy or methyl carbamyloxy.

B and B' in graphic formula IXA are each selected from unsubstituted and mono, di or poly substituted aryl groups, phenyl and naphthyl, preferably mono- or di-substituted phenyl or naphthyl; the substituted or unsubstituted heterocyclic groups, pyridyl, thienyl, furyl, piperidinyl, and furfuryl; $C_1$-$C_4$ alkyl, $C_1$-$C_4$ haloalkyl, e.g., (chloro or fluoro) $C_1$-$C_4$ alkyl, $C_1$-$C_4$ alkoxy($C_1$-$C_4$)alkyl, $C_3$-$C_6$ cycloalkyl, $C_1$-$C_4$ alkoxy($C_3$-$C_6$)cycloalkyl, halo(chloro or fluoro) $C_3$-$C_6$ cycloalkyl, or B and B' may combine and taken together form adamantylidene.

.The substituents for the aryl groups representing B and B' may be $C_1$-$C_4$ alkyl, $C_1$-$C_4$ haloalkyl, $C_1$-$C_4$ alkoxy, $C_1$-$C_4$ alkoxy($C_1$-$C_4$)alkyl, and halogen. The halogen (or halo group in the haloalkyl) may be chlorine or fluorine. Phenyl substituents may be located at the ortho, meta, and/or para positions. Typically, the phenyl substituent contains less than 3 substituents, i.e., zero (none), one or two substituents.

Substituents for the heterocyclic groups representing B and B' may be $C_1$-$C_4$ alkyl, $C_1$-$C_4$ haloalkyl, $C_1$-$C_4$ alkoxy, $C_1$-$C_4$ alkoxy($C_1$-$C_4$)alkyl, or halogen. The halogen (or halo group in the haloalkyl) may be chlorine or fluorine.

Preferably B and B' are each phenyl or substituted phenyl, e.g., mono-or di-($C_1$-$C_4$)alkyl phenyl, such as methylphenyl; mono- or di-($C_1$-$C_4$)alkoxyphenyl, such as methoxyphenyl; chlorophenyl and fluorophenyl.

Photochromic naphthopyrans having a spiro-adamantane group at the 2-position of the naphthopyran ring are described in U.S. Pat. No. 4,826,977. Such compounds color to yellow/orange upon activation with UV light, and may be represented by the following graphic formula X,

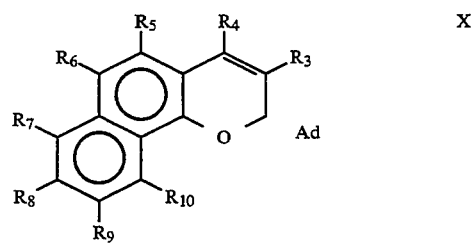

wherein Ad represents the adamantane group and $R_3$-$R_{10}$ of graphic formula X are the same as that defined with respect to graphic formula VIII.

The pyran-type compounds described herein that color to yellow/orange may be combined with or used in conjunction with the photochromic compounds that color to purple/blue, e.g., the spirooxazine-type compounds, described herein in amounts and in a ratio such that an organic host material to which the mixture of compounds is applied or in which they are incorporated exhibits a desired resultant color, e.g., a substantially neutral color such as shades of gray or brown, when activated with unfiltered sunlight, i.e., as near a neutral color as possible given the colors of the activated pyran and oxazine photochromic compounds. The relative amounts of the aforesaid oxazine and pyran compounds used will vary and depend in part upon the relative intensities of the color of the activated species of such compounds, and the ultimate color desired. Generally, the weight ratio of the aforedescribed oxazine compound(s) to the pyran compound(s) will vary from about 1:3 to about 3:1, e.g., between about 0.75:1 and about 2:1.

The photochromic compositions of the present invention may be applied to or incorporated into a host material by various methods described in the art. Such methods include dissolving or dispersing the substance within the host material, e.g., imbibition of the photochromic substance into the host material by immersion of the host material in a hot solution of the photochromic substance or by thermal transfer; providing the photochromic substance as a separate layer between adjacent layers of the host material, e.g., as a part of a polymer film; and applying the photochromic substance as part of a coating placed on the surface of the host material. The term "imbibition" or "imbibe" is intended to mean and include permeation of the photochromic substance alone into the host material, solvent assisted transfer absorption of the photochromic substance into a porous polymer, vapor phase transfer, and other such transfer mechanisms.

Compatible (chemically and color-wise) tints, i.e., dyes, may be applied to the host material to achieve a more aesthetic result, for medical reasons, or for reasons of fashion. The particular dye selected will vary and depend on the aforesaid need and result to be achieved. In one embodiment, the dye may be selected to complement the color resulting from the activated photochromic substances, e.g., to achieve a more neutral color or absorb a particular wavelength of incident light. In another embodiment, the dye may be selected to provide a desired hue to the host matrix when the photochromic substances is in an unactivated state.

The polymer host material will usually be transparent, but may be translucent or even opaque. The polymer product need only be transparent to that portion of the electromagnetic spectrum, which activates the photochromic substance, i.e., that wavelength of ultraviolet (UV) light that produces the open form of the substance and that portion of the visible spectrum that includes the absorption maximum wavelength of the substance in its UV activated form, i.e., the open form. Further, the resin color should not be such that it masks the color of the activated form of the photochromic substance, i.e., so the change in color is readily apparent to the observer. Preferably, the host material article is a solid transparent or optically clear material, e.g., materials suitable for optical applications, such as plano and ophthalmic lenses, windows, automotive transparencies, e.g., windshields, aircraft transparencies, plastic sheeting, etc.

Examples of host materials which may be used with the photochromic substances or compositions described herein include: polymers, i.e., homopolymers and copolymers, of polyol(allyl carbonate) monomers, polymers, i.e., homopolymers and copolymers, of polyfunctional acrylate monomers, polyacrylates, poly(alkylacrylates) such as poly(methyl methacrylate), cellulose acetate, cellulose triacetate, cellulose acetate propionate, cellulose acetate butyrate, poly(vinyl acetate), poly(vinyl alcohol), poly(vinyl chloride), poly(vinylidene chloride), polyurethanes, polycarbonates, poly(ethylene terephthalate), polystyrene, copoly(styrene-methyl methacrylate) copoly(styrene-acrylonttrile), polyvinylbutyral and polymers, i.e., homopolymers and copolymers, of diallylidene pentaerythritol, particularly copolymers with polyol (allyl carbonate) monomers, e.g., diethylene glycol bis(allyl carbonate), and acrylate monomers.

Transparent copolymers and blends of transparent polymers are also suitable as host materials. Preferably, the host material is an optically clear polymerized organic material prepared from a polycarbonate resin, such as the carbonate-linked resin derived from bisphenol A and phosgene, which is sold under the trademark, LEXAN; a poly(methyl methacrylate), such as the material sold under the trademark, PLEXIGLAS; polymerizates of a polyol(allyl carbonate) monomer, especially diethylene glycol bis(allyl carbonate), which monomer is sold under the trademark CR-39, and polymerizates of copolymers of a polyol (allyl carbonate), e.g., diethylene glycol bis(allyl carbonate), with other copolymerizable monomeric materials, such as copolymers with vinyl acetate, e.g., copolymers of from 80–90 percent diethylene glycol bis(allyl carbonate) and 10–20 percent vinyl acetate, particularly 80–85 percent of the bis(allyl carbonate) and 15–20 percent vinyl acetate, and copolymers with a polyurethane having terminal diacrylate functionality, as described in U.S. Pat. Nos. 4,360,653 and 4,994,208; cellulose acetate, cellulose propionate, cellulose butyrate, cellulose acetate butyrate, polystyrene and copolymers of styrene with methyl methacrylate, vinyl acetate and acrylonitrile.

The amount of photochromic substance or composition containing same applied to or incorporated into a host material is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more compound applied or incorporated, the greater is the color intensity. Generally, the amount of total photochromic substance incorporated into or applied to a photochromic optical host material may range from about 0.15 to about 0.35 milligrams per square centimeter of surface to which the photochromic substance(s) is incorporated or applied.

The present invention is more particularly described in the following examples which are intended as illustrative only, since numerous modifications and variations therein will be apparent to those skilled in the art.

EXAMPLE

To 3.5 grams (g) of a 10 weight percent solution of ethyl cellulose in toluene was added 32 milligrams (mg) of a mixture of the following photochromic compounds, (a) 3(2,4-dimethoxyphenyl)-3(4-methoxyphenyl)-3H-naphtho[2,1-b]-pyran, (b) 3,3,4(and 6),5-tetramethyl-1-n-propylspiro[indolino-2,3'[3H] pyrido [3,2-f][1,4] benzoxazine], and (c) 3,3-dimethyl-1-n-propyl-5-methoxyspiro[indolino-2,3'[3H] pyrido [3,2-f][1,4] benzoxazine]. The weight ratio of the photochromic compounds (a):(b):(c) was 40:35:25.

Stabilizer material(s), as defined in Table II, was added to the photochromic solution and the resultant mixture applied as a film of about 0.020 inches to duplicate glass slides using a wet film blade applicator. The film was heated to 90° C. for thirty minutes to produce a dry photochromic ethyl cellulose film. The light fatigue resistance of the photochromic film was measured on an Ealing Triangular optical bench equipped with a 300 watt Xenon arc lamp. Light from the arc lamp was passed through a copper sulfate bath to remove infrared, a neutral density filter to regulate irradiance, a shutter assembly and then the sample. The optical density of the activated photochromic film was monitored with a silicon photo detector/radiometer assembly.

TABLE II

| Sample No. | Stabilizer Material(s) | Amount of Stabilizer Mtl. mg/32 mg Photochromic | Weight Ratio Total Stabilizer/ Total Photochromic | Fatigue[1] (hrs.) T (¾) | T (½) |
|---|---|---|---|---|---|
| 1. | NONE | — | — | 145 | 295 |
| 2. | HALS[2] | 4 | ⅛ | 190 | 355 |
| 3. | HALS[3] | 4 | ⅛ | 140 | 300 |
| 4. | HALS[3] | 16 | ½ | 145 | 290 |
| 5. | HALS[4] | 4 | ⅛ | 160 | 310 |
| 6. | HALS[4] | 16 | ½ | 180 | 360 |
| 7. | OXANILIDE[5] | 4 | ⅛ | 135 | 270 |
| 8. | OXANILIDE[5] | 8 | ¼ | 140 | 280 |
| 9. | OXANILIDE[6] | 4 | ⅛ | 105 | 230 |
| 10 | OXANILIDE[6] | 8 | ¼ | 130 | 280 |
| 11 | OXANILIDE[6] HALS[4] | 16 8 | ¾ | 245 | 486 |
| 12. | OXANILIDE[5] HALS[4] | 16 8 | ¾ | 210 | 410 |

Legend for Table II
1. The rate at which the photochromic response decreases with extended exposure to ultraviolet light supplied by UVA-351 lamps. T (¾) and T (½) is the time in hours for the photochromic response to decrease to ¾ and ½ respectively of the initial photochromic response (amount of darkening as measured by the change in optical density).
2. Bis (2,2,6,6-tetramethyl-4-piperidyl sebacate)
3. SANDUVOR 3052 hindered amine light stabilizer
4. SANDUVOR 3050 hindered amine light stabilizer
5. SANDUVOR 3206 oxanilide
6. SANDUVOR VSU, o-ethoxy-o'ethyl oxalic acid bis anilide The data of Table II show that certain HALS materials may provide some resistance to light fatigue (Sample Nos. 2, 5 and 6), while other HALS materials make the light fatigue resistance worse or have no effect (Sample Nos. 3 and 4). The oxanilide materials did not improve the light fatigue resistance. However, the combination of oxanilide and HALS materials in the amounts shown significantly increase the light fatigue resistance of the photochromic compositions (Samples 11 and 12).

Although the present invention has been described with reference to the specific details of particular embodiments thereof, it is not intended that such details should be regarded as limitations upon the scope of the invention except as to the extent that they are included in the accompanying claims.

We claim:

1. A photochromic optical article of improved resistance to light fatigue comprising an organic polymeric host material and a photochromic composition comprising, in combination,
   (a) a photochromic amount of organic photochromic material having a minima luminous transmission in the range of 560 to 630 nanometers,
   (b) a photochromic amount of organic photochromic material having a minima luminous transmission in the range of 430 to 520 nanometers, and
   (c) from 0.3 to 1.5 parts, per part of organic photochromic material, of light stabilizers comprising, in combination,
      (1) hindered amine light stabilizer, and
      (2) asymmetric diaryloxalamide light stabilizer, the weight ratio of diaryloxalamide to hindered amine light stabilizer being from about 1:1 to about 3:1.

2. The article of claim 1 wherein,
   (a) the photochromic material having a minima luminous transmission in the range of 560 to 630 nanometers is selected from the group consisting of spiro-oxazine photochromic compounds and naphthopyran compounds having a nitrogen-containing substituent at the 2-position of the pyran ring,
   (b) the photochromic material having a minima luminous transmission in the range of 430 to 520 nanometers is a naphthopyran photochromic compound other than those photochromic compounds having a nitrogen-containing substituent at the 2-position of the pyran ring, and
   (c) the weight ratio of photochromic material (a) to photochromic material (b) being from about 1:3 to about 3:1.

3. The article of claim 2 wherein spiro-oxazine photochromic material (a) is selected from spiro(indoline) pyrido benzoxazines, spiro(indoline) naphthoxazines and spiro(indoline) benzoxazines, and the naphthopyran photochromic material (b) is selected from naphthopyrans having a spiro-adamantane group at the 2-position of the naphthopyran ring and naphthopyrans having at least one ortho-substituted phenyl group at the 3-position of the pyran ring.

4. The article of claim 3 wherein the hindered amine light stabilizer is bis(1,2,2,6,6-pentamethyl-4-piperdinyl)[3,5-bis(1,1-dimethylethyl-4-hydroxyphenyl) methyl]butyl propanedioate and the diaryloxalamide light stabilizer is o-ethoxy-o'-ethyl-oxalic acid bis anilide.

5. The article of claim 3 wherein the article is a lens.

6. The article of claim 4 wherein the article is a lens.

7. The article of claim 1 wherein the organic polymeric host material is selected from the group consisting of polymers prepared from polyol(allyl carbonate) monomer, polyfunctional acrylate monomer, acrylate monomer, alkylacrylate monomer, cellulose acetate, cellulose triacetate, cellulose acetate propionate, cellulose acetate butyrate, poly(vinyl acetate), poly(vinyl alcohol), poly(vinyl chloride) poly(vinylidene chloride), polycarbonate, polyurethanes, poly(ethylene terephthalate), polystyrene, copoly(styrene-methyl methacrylate), copoly(styrene-acrylonitrile), polyvinylbutyral and diallylidene pentaerythritol.

8. The article of claim 3 wherein the organic polymeric host material is a polymer prepared from polyol(allyl carbonate) monomer.

9. A photochromic optical article of improved resistance to light fatigue comprising a solid transparent organic polymeric host material and a photochromic composition comprising, in combination,
 (a) a photochromic amount of an organic photochromic material having a minima luminous transmission in the range of 580 to 620 nanometers,
 (b) a photochromic amount of an organic photochromic material having a minima luminous transmission in the range of 450 to 500 nanometers,
 (c) from 0.3 to 1.0 part, per part of organic photochromic material, of light stabilizers comprising, in combination,
  (1) hindered sine light stabilizer, and
  (2) asymmetric diaryloxalamide light stabilizer, the weight ratio of diaryloxalamide to hindered amine light stabilizer being from about 1:1 to about 3:1.

10. The article of claim 9 wherein the organic polymeric host material is a homopolymer or copolymer of diethylene glycol bis(allyl carbonate), polycarbonate resin, poly(methyl methacrylate) or poly(vinyl butyral).

11. The article of claim 9 wherein photochromic material (a) is selected from the group consisting of spiro-oxazine photochromic compounds and naphthopyran compounds having a nitrogen-containing substituent at the 2-position of the pyran ring, photochromic material (b) is a naphthopyran compound other than those having a nitrogen-containing substituent at the 2-position of the pyran ring, and the weight ratio of photochromic material (a) to photochromic material (b) being from about 1:3 to about 3:1.

12. The article of claim 11 wherein spiro-oxazine photochromic material (a) is selected from spiro(indoline) pyrido benzoxazines, spiro(indoline) naphthoxazines and spiro(indoline) benzoxazines, and the naphthopyran photochromic material (b)is selected from naphthopyrans having a spiro-adamantane group at the 2-position of the naphthopyran ring and naphthopyrans having at least one ortho-substituted phenyl group at the 3-position of the pyran ring.

13. The article of claim 12 wherein the organic polymeric host material is a homopolymer or copolymer of diethylene glycol bis(allyl carbonate).

14. The article of claim 13 wherein the article is a lens.

15. The article of claim 13 wherein the hindered amine light stabilizer is bis(1,2,2,6,61pentamethyl-4-piperdinyl)[3,5-bis(1,1-dimethylethyl-4-hydroxyphenyl)methyl]butyl propanedioate and the diaryloxalamide light stabilizer is o-ethoxy-o'-ethyl-oxalic acid bis anilide.

16. A photochromic optical article of improved resistance to light fatigue comprising an organic polymeric host material and a photochromic composition comprising, in combination,
 (a) a photochromic amount of photochromic material having a minima luminous transmission in the range of 560 to 630 nanometers,
 (b) a photochromic amount of photochromic material having a minima luminous transmission in the range of 430 to 520 nanometers, and
 (c) a stabilizing amount of stabilizer material comprising, in combination,
  (1) hindered amine light stabilizer, and
  (2) asymmetric diaryloxalamide light stabilizer, the weight ratio of diaryloxalamide to hindered amine light stabilizer being from about 1:1 to about 3:1.

17. The article of claim 16 wherein,
 (a) the photochromic material having a minima luminous transmission in the range of 560 to 630 nanometers is selected from the group consisting of spiro-oxazine photochromic compounds and naphthopyran photochromic compounds having a nitrogen-containing substituent at the 2-position of the pyran ring,
 (b) the photochromic material having a minima luminous transmission in the range of 430 to 520 nanometers is a naphthopyran photochromic compound other than those photochromic compounds having a nitrogen-containing substituent at the 2-position of the pyran ring, and
 (c) the weight ratio of photochromic material (a) to photochromic material (b) being from about 1:3 to about 3:1.

18. The article of claim 17 wherein spiro-oxazine photochromic material (a) is selected from spiro(indoline) pyrido benzoxazines, spiro(indoline) naphthoxazines and spiro(indoline) benzoxazines, and the naphthopyran photochromic material (b) is selected from naphthopyrans having a spiro-adamantane group at the 2-position of the naphthopyran ring and naphthopyrans having at least one ortho-substituted phenyl group at the 3-position of the pyran ring.

19. The article of claim 16 wherein the organic polymeric host material is selected from the group consisting of polymers prepared from polyol(allyl carbonate) monomer, polyfunctional acrylate monomer, acrylate monomer, alkylacrylate monomer, cellulose acetate, cellulose triacetate, cellulose acetate propionate, cellulose acetate butyrate, poly(vinyl acetate), poly(vinyl alcohol), poly(vinyl Chloride), poly(vinylidene chloride), polycarbonate, polyurethanes, poly(ethylene terephthalate), polystyrene, copoly(styrene-methyl methacrylate), copoly(styrene-acrylonitrile), polyvinylbutyral and diallylidene pentaerythritol.

20. The article of claim 19 wherein the organic polymeric host material is a polymer prepared from polyol(allyl carbonate) monomer, polyfunctional acrylate monomer, acrylate monomer, alkylacrylate monomer, polycarbonate or polyurethane.

21. The article of claim 20 wherein the hindered amine light stabilizer is bis(1,2,2,6,6-pentamethyl-4-piperdinyl)[3,5-bis(1,1-dimethylethyl-4-hydroxyphenyl)methyl]butyl propanedioate, bis(2,2,6,6-tetramethyl-4-piperdyl) sebacate, or bis(1,2,2,6,6-pentamethyl-4-piperidyl) sebacate and the diaryloxalamide light stabilizer is o-ethoxy-o'-ethyl-oxalic acid bis anilide.

22. The article of claim 21 wherein the article is a lens.

* * * * *